US012766990B2

(12) United States Patent
Salter et al.

(10) Patent No.: US 12,766,990 B2
(45) Date of Patent: Oct. 20, 2026

(54) SYSTEMS AND METHODS FOR STATE OF CHARGE (SOC)-BASED ACTIVATION AND CONTROL

(71) Applicant: Ford Global Technologies, LLC, Dearborn, MI (US)

(72) Inventors: Stuart C. Salter, White Lake, MI (US); Vyas Shenoy, Canton, MI (US); Tyler James-Ray Kaldobsky, Canton, MI (US); David Lew, Canton, MI (US); Brendan Diamond, Grosse Pointe, MI (US)

( * ) Notice: Subject to any disclaimer, the term of this patent is extended or adjusted under 35 U.S.C. 154(b) by 1008 days.

(21) Appl. No.: 17/938,777

(22) Filed: Oct. 7, 2022

(65) Prior Publication Data

US 2024/0116385 A1 Apr. 11, 2024

(51) Int. Cl.

*B60L 53/62* (2019.01)
*B60L 1/00* (2006.01)
*B60L 53/00* (2019.01)
*B60L 53/66* (2019.01)
*B60L 58/12* (2019.01)
*B60L 58/15* (2019.01)
*H02J 7/50* (2026.01)

(52) U.S. Cl.

CPC ................. *B60L 53/62* (2019.02); *B60L 1/00* (2013.01); *B60L 53/66* (2019.02); *B60L 58/12* (2019.02); *H02J 7/50* (2026.01); *B60L 53/00* (2019.02); *B60L 58/15* (2019.02)

(58) Field of Classification Search

CPC .. B60L 53/62; B60L 1/00; B60L 53/66; B60L 58/12; B60L 53/00; B60L 58/15; B60L 2250/16; B60L 53/63; B60L 58/14; H02J 7/0013; H02J 2310/48; H02J 7/00047; H02J 7/0048

USPC ........................................................ 320/109

See application file for complete search history.

(56) References Cited

U.S. PATENT DOCUMENTS 9,197,091 B2 11/2015 Kishiyama et al.
2004/0169489 A1* 9/2004 Hobbs ............... H02J 7/007182 320/104
2011/0043165 A1* 2/2011 Kinser .................... B60L 1/003 320/109
2015/0236524 A1* 8/2015 Takano ................ G01R 31/387 320/107

(Continued)

OTHER PUBLICATIONS

2022 F-150 Lightning Pro, The Ford Media Center, 1-8.

*Primary Examiner* — Julian D Huffman
*Assistant Examiner* — Lisa Kotowski
(74) *Attorney, Agent, or Firm* — Frank Lollo; Eversheds Sutherland (US) LLP

(57) ABSTRACT

Systems and methods for managing the allocation of incoming charge power between an on-board power supply power output and HV battery power input. An electric vehicle (EV) may be used to provide power to one or more electrical devices connected to an on-board power supply of the EV. When the EV is connected to a charging device, a rate of charge may be determined. An allocation of the incoming charge power from the charging device may be determined as between a high voltage (HV) battery of the electric vehicle and the on-board power supply of the electric vehicle. Power may be simultaneously provided to the HV battery and the on-board power supply.

20 Claims, 6 Drawing Sheets

User Preferences

| Charge Rate | % of Power to PPOB | % of power to HV battery |
|---|---|---|
| 5 kW | 20% | 80% |
| 10 kW | 40% | 60% |
| 20 kW | 30% | 70% |
| 50 kW | 20% | 80% |
| 100 kW | 10% | 90% |
| 200 kW | 5% | 95% |
| 350 kW | 4% | 96% |

User Preferences

| SOC State | % of Power to PPOB | % of power to HV battery |
|---|---|---|
| <10% | 10% | 90% |
| 10-20% | 20% | 80% |
| 20-40% | 30% | 70% |
| 40-70% | 40% | 60% |
| >70% | 50% | 50% |

(56) References Cited

U.S. PATENT DOCUMENTS

| | | | | |
|---|---|---|---|---|
| 2016/0159229 | A1* | 6/2016 | Enomoto | B60L 58/12 320/109 |
| 2020/0361333 | A1* | 11/2020 | Satoh | H01M 10/443 |
| 2021/0094441 | A1* | 4/2021 | Sampson | B60K 1/02 |
| 2022/0016982 | A1* | 1/2022 | Johnson | B60L 58/20 |
| 2023/0177890 | A1* | 6/2023 | Salter | G07C 5/0816 701/29.6 |
| 2023/0246467 | A1* | 8/2023 | Salter | B60L 50/60 320/109 |

* cited by examiner

502A

| User Preferences | | |
|---|---|---|
| Charge Rate | % of Power to PPOB | % of power to HV battery |
| 5 kW | 20% | 80% |
| 10 kW | 40% | 60% |
| 20 kW | 30% | 70% |
| 50 kW | 20% | 80% |
| 100 kW | 10% | 90% |
| 200 kW | 5% | 95% |
| 350 kW | 4% | 96% |

502B

| User Preferences | | |
|---|---|---|
| SOC State | % of Power to PPOB | % of power to HV battery |
| <10% | 10% | 90% |
| 10-20% | 20% | 80% |
| 20-40% | 30% | 70% |
| 40-70% | 40% | 60% |
| >70% | 50% | 50% |

SYSTEMS AND METHODS FOR STATE OF CHARGE (SOC)-BASED ACTIVATION AND CONTROL

BACKGROUND

An electric vehicle (EV) such as a battery electric vehicle (BEV) or hybrid vehicle may provide exportable power. Exportable power may be used to transform an EV into a power source that provides power to any number of appliances, such as laptops, speakers, lighting elements, or heating elements such as tar heaters or truck bed heaters. In various EVs, a high-voltage (HV) battery may be used to provide mobility and may be simultaneously used to provide exportable power to appliances.

There are many challenges involved in how to properly charge an EV, especially in low SOC conditions. On the one hand, it is important to provide uninterrupted power to external devices that rely on the exportable power function. On the other hand, it is important to recharge a battery within a satisfactory amount of time. In extreme examples, external devices cold hypothetically draw more power than is being provided by an external power source. One such solution is to unilaterally disable or otherwise cease to provide exportable power when the vehicle is in low SOC conditions and/or range, to remain disabled while the vehicle starts to charge, and then to re-enable the exportable power functionality when the SOC and/or range is above a certain minimum threshold and the vehicle is keyed off and on again. However, this type of behavior may not always be desired by users.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
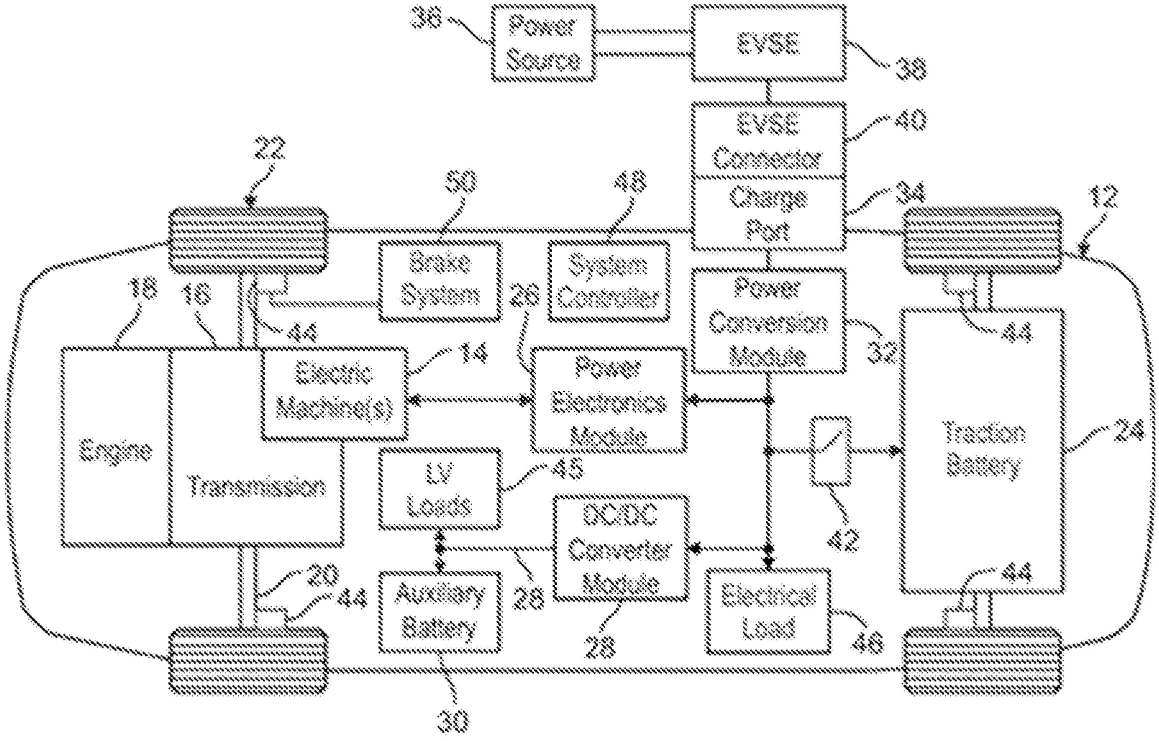
FIG. 1 illustrates an example of an electrified vehicle, according to at least one embodiment of the present disclosure.

The present disclosure is directed to systems and methods for intelligent allocation of charge between an activation and control power system and a vehicle battery. User preferences may be specified to allow for different types of power flow goals to be achieved. For example, if an activation and control power system is being used to provide power to an electric appliance in which a continuous supply of power is critical, then power may be diverted away from the vehicle battery and to the activation and control power system.

Disclosed is an activation and control system for on-board power supply vehicle features. An on-board power supply system may be used to communicate with a vehicle charger or battery energy control module (BECM)—for example, during charging of the vehicle—to determine the vehicle charge rate and control the on-board power supply operation to ensure that the customer is not surprised by either on-board power supply being turned off or getting excessively long charge times for the BEV. The system may involve wired/wireless communications between the vehicle and the charger including information such as charge rate and user preferences. The system may also be used to control the power flow of the charger (for example, how much of the power is provided to on-board power supply and how much is provided to charge the vehicle battery). To realize this functionality, the charger and/or associated vehicle control systems may be used to implement one or more of the functionalities disclosed herein.

In various embodiments, a setup may be performed and conditions for entry into the feature may be established. Consider the operation of a BEV or other vehicle that relies on electric power for mobility. When the vehicle enters into a low range/low SOC state, a naïve approach to power management may involve the vehicle automatically turning off the on-board power supply so as to preserve as much power as possible for the battery to ensure that the vehicle has as much range as possible to reach a charging station. However, in this naïve approach, there may be adverse consequences of unilaterally disabling any the on-board power supply system as any electrical devices or appliances connected to the on-board power supply system would be powered off.

In various embodiments, techniques described herein may be utilized to perform intelligent power manage of the on-board power supply system during low SOC state as well as in other SOC states. During setup, the user may provide customizable preferences regarding various charging goals. Example user preferences can include: specifying a maximum amount of incoming charge power that can be diverted to the on-board power supply, a minimum range accumulation rate, a minimum range before on-board power supply is functional again, or any other metric that can be controlled via a look up table where the charger capability and/or charging rate is the input and the maximum power diverted to the on-board power supply is an output, either in terms of an absolute amount or a percentage amount. First, a maximum percentage of incoming charge power that can be diverted to the on-board power supply (for example, instead of being provided to the HV battery). For example, a user can specify that the vehicle will divert a maximum of 40% of the charger power to the on-board power supply for usage (and the remainder of the charge to the HV battery). Second, a minimum range accumulation rate (for example, the HV battery must realize 2 mi/min of charging while the on-board power supply is in use). Third, a minimum range before on-board power supply is functional again. Fourth, any of the previous metrics can be controlled via a look-up table where the charger capability/charge rate is the input, and the maximum power diverted to the on-board power supply will be the output. These metrics can be computed on a time-averaged basis to allow for short transients in which the on-board power supply can discharge at higher magnitudes than the inputted user preferences (for example, if the on-board power supply is not operating at 100% of the allowed limit in the time before the transient).

The vehicle may use wireless and/or wired communication with the charger to determine the charge rate of the HV battery. The vehicle can also stay keyed on in this low SOC/on-board power supply on state and reference the appropriate on-board charge control module (AC charging)/BECM (DC Charging) signals to determine the charge rate of the HV battery. This charge rate may then be communicated with the appropriate on-board power supply control modules so that the system is aware of the incoming charger power. The system may reference the user preferences relating to how the charge power should be distributed to the on-board power supply and HV battery. The vehicle may then control the on-board power supply power output and HV battery power input as desired. This may be accomplished by shutting off individual outlets according to priority assigned in the on-board power supply setup. Alternatively, the vehicle can provide pulse width modulation (PWM) power to outlets, which may allow processes such as motors, lights, heaters, etc. to operate at lower capacity. The rate (or frequency) at which the power supply switches can be varied based on load and application.

If the on-board power supply is not using the full capability of its rationed power, the remaining portion may be used to charge the HV battery. The vehicle may use the infotainment system (and other systems) to communicate the current HV battery charge rate in Watts or in mileage accumulation per minute as well as the on-board power supply power draw. The average energy consumption as estimated by the "distance to empty" feature can be used to control the display of range accumulation. If on-board power supply discharge power is de-rated/throttled, the vehicle can flash lights, make an audible noise with sound exciters, or use the display screens to communicate this to the user.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "electric vehicle" (EV) and the phrase "battery electric vehicle" (BEV) may be used interchangeably in this disclosure and must be understood to refer to any type of vehicle that operates an electric motor by use of a rechargeable battery. The word "battery" as used herein encompasses a single battery as well as a set of batteries that are interconnected to form a battery bank. It must be understood that words such as "implementation," "scenario," "case," "application," and "situation" are to be understood as examples in accordance with the disclosure. It should be understood that the word "example" as used herein is intended to be non-exclusionary and non-limiting in nature.

FIG. 1 illustrates an example of an electrified vehicle, referred to as an electrified vehicle 12 herein. In this example, the electrified vehicle is shown as a plug-in hybrid electric vehicle (PHEV). The electrified vehicle 12 may include one or more electric machines 14 mechanically coupled to a gearbox or hybrid transmission 16. Each of the electric machines 14 may be capable of operating as a motor and a generator. In addition, the hybrid transmission 16 is mechanically coupled to an engine 18 and the hybrid transmission 16 is mechanically coupled to a drive shaft 20 that is mechanically coupled to a set a set of wheels 22. The electric machines 14 may provide propulsion and braking capability when the engine 18 is turned on or off. The electric machines 14 may also act as generators and provide fuel economy benefits by recovering energy that would normally be lost as heat in a friction braking system. The electric machines 14 may also reduce vehicle emissions by allowing the engine 18 to operate at more efficient speeds and allowing the electrified vehicle 12 to be operated in electric mode with the engine 18 off under certain conditions. The electrified vehicle 12 may also be a battery electric vehicle (BEV), a full hybrid electric vehicle (FHEV), a mild hybrid electric vehicle (MHEV), or other vehicle utilizing an electric drive and/or an electric motor. In a BEV configuration, the engine 18 may not be present.

A battery pack or traction battery 24 stores energy that may be used by the electric machines 14. The traction battery 24 may provide a high voltage direct current (DC) output. A contactor module 42 may include one or more contactors to isolate the traction battery 24 from a high-voltage bus 52 when opened and to connect the traction battery 24 to the high-voltage bus when closed. The high-voltage bus may include power and return conductors for carrying current. The contactor module 42 may be located adjacent to or within the traction battery 24. One or more power electronics modules 26 (which may also be referred to as an inverter or power module) may be electrically coupled to the source-voltage bus. The power electronics modules 26 are electrically coupled to the electric machines 14 and provide the ability to bi-directionally transfer energy between the traction battery 24 and the electric machines 14. For example, a traction battery 24 may provide a DC voltage while the electric machines 14 may operate with a three-phase alternating current (AC). The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The traction battery 24 may be a high-voltage (HV) battery including one or more battery cells linked to one another to power components of the vehicle 12 such as the motor.

In addition to providing energy for propulsion, the traction battery 24 may provide energy for other vehicle electrical systems. The electrified vehicle 12 may include a DC/DC converter module 28 that converts the high voltage DC output from the high-voltage bus to a low-voltage DC level of a low-voltage bus that is compatible with low-voltage loads 45. An output of the DC/DC converter module 28 may be electrically coupled to an auxiliary battery 30 (e.g., a 12V battery) for charging the auxiliary battery 30. The low-voltage loads 45 may be electrically coupled to the auxiliary battery 30 via the low-voltage bus. One or more high-voltage electrical loads 46 may be coupled to the high-voltage bus. The high-voltage electrical loads 46 may have an associated controller that operates and controls the high-voltage electrical loads 46 when appropriate. Examples of high-voltage electrical loads 46 may be a fan, an electric heating element and/or an air-conditioning compressor.

Traction battery 24 may be used to provide power to electrical devices. Electric vehicle 12 may have an on-board power supply system that allows the vehicle to use the traction battery 24 to provide large amounts of electrical power to its customers. The on-board power supply system may be used to power many industrial processes in the truck bed/or trailer such as asphalt bed heaters or tar kettles, etc. It should be appreciated that customers using some or all of these electrical appliances would not want to be shut off while the BEV charged, as their use may be important or even critical for industrial and/or personal uses. In various embodiments, the on-board power supply system is able to draw substantial amounts of power, which can have a non-trivial effect to the charging time. For example, different types of chargers may be able to provide different amounts of incoming charge power to an electric vehicle. For example, a L1 charger that plugs directly into a standard 120 volt (V) AC outlet may supply an average power output of 1.3 kW to 2.4 kW. For a typical EV, this power output would be equivalent to 3-5 miles of EV range per hour. As a second example, an electric vehicle charging at home on a 240-volt L2 charger may draw roughly 7.2 kW. As a point of comparison, an on-board power supply system may be used to power an electric furnace that can draw up to 10 kW or more and a water heater can use approximately 4.5 kW. Activation and control systems described herein may utilize various strategies to determine an appropriate distribution of incoming charge power from charging devices to facilitate the charging of a HV battery while simultaneously also providing power to electrical devices via the on-board power supply system.

In a PHEV embodiment, the electrified vehicle 12 may be configured to recharge the traction battery 24 via an external power source 36. The external power source 36 may include a connection to an electrical outlet. The external power source 36 may be electrically coupled to a charge station or an electric vehicle supply equipment (EVSE) 38. The external power source 36 may be an electrical power distribution network or grid as provided by an electric utility company. The EVSE 38 may provide circuitry and controls to manage the transfer of energy between the external power source 36 and the electrified vehicle 12. The external power source 36 may provide DC or AC electric power to the EVSE 38. The EVSE 38 may have a charge connector 40 for coupling to a charge port 34 of the vehicle 12. The charge port 34 may be any type of suitable port configured to transfer power from the EVSE 38 to the vehicle 12. The charge port 34 may be electrically coupled to an on-board power conversion module 32 which may operate as a charger. The power conversion module 32 may condition the power supplied from the EVSE 38 to provide appropriate voltage and current levels to the traction battery 24 and the high-voltage bus. The power conversion module 32 may interface with the EVSE 38 to coordinate the delivery of power to the electrified vehicle 12. The EVSE connector 40 may have pins to mate with corresponding recesses of the charge port 34.

One or more wheel brakes 44 may be provided for slowing the electrified vehicle 12 and preventing motion of the electrified vehicle 12. The wheel brakes 44 may be hydraulically actuated, electrically actuated, or some combination thereof. The wheel brakes 44 may be a part of a brake system 50. The brake system 50 may include other components to operate the wheel brakes 44.

Techniques described above in connection with FIG. 1 should be considered illustrative in nature and non-limiting in scope, unless otherwise made clear by the context of the disclosure. The environment described in FIG. 1 may be used to implement various techniques described in connection with FIGS. 2-6, which are described in detail below.

Figure 2:
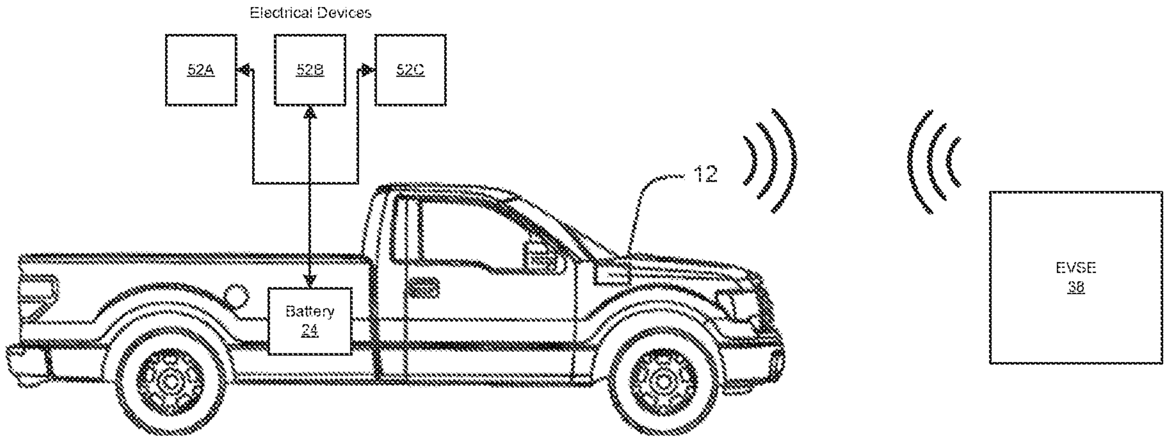
FIG. 2 illustrates an electric vehicle and a charging station using Bluetooth Low Energy (BLE), according to at least one embodiment of the present disclosure.

FIG. 2 illustrates an embodiment in which a vehicle 12 communicates with a charge station or an electric vehicle supply equipment (EVSE) 38 using Bluetooth Low Energy (BLE), according to at least one embodiment.

In various embodiments, vehicle 12 may be a battery electric vehicle and may be implemented in accordance with techniques described in connection with FIG. 1. Vehicle 12 may include one or more batteries 24 that may be used for various purposes, such as to provide power to an electric motor. An on-board power supply system may use the HV battery to provide large amounts of electrical power that may be used to supply power for use by one or more electrical devices such as electrical devices depicted as 52A, 52B, and 52C in FIG. 2. The devices may be powered through standard 120 volt (V) AC outlets.

Disclosed is an activation and control system for on-board power supply vehicle features. An on-board power supply system may be used to communicate with a vehicle charger or battery energy control module (BECM)—for example, during charging of the vehicle—to determine the vehicle charge rate and control the on-board power supply operation to ensure that the customer is not surprised by either on-board power supply being turned off or getting excessively long charge times for the BEV. The system may involve wired/wireless communications between the vehicle and the charger including information such as charge rate and user preferences. The system may also be used to control the power flow of the charger (for example, how much of the power is provided to on-board power supply and how much is provided to charge the vehicle battery). To realize this functionality, the charger and/or associated vehicle control systems may be used to implement one or more of the functionalities disclosed herein.

In accordance with at least one embodiment, the on-board power supply system of an electric vehicle communicates with a charging device and/or BECM battery energy control module (BECM) to determine the vehicle charge rate. The incoming charge power may be distributed to ensure that the customer is not surprised by the on-board power supply system being turned or by excessively long charge times (e.g., due to a disproportionally large amount of the incoming charge power being diverted to the on-board power supply).

In a typical setup, the vehicle may utilize various wireless (BLE, Wi-Fi, etc.) and/or wired technologies to communicate with charging devices, such as charging stations. One such example of wireless communications involves the use of Bluetooth Low Energy (BLE). In various embodiments, a vehicle may have a main BLE module configured to send and receive signals via an antenna with the antenna of the charging device. The vehicle may also have one or more BLE antenna modules (BLEAMs) at various locations inside or outside the vehicle. The BLEAMs may allow for localization, signal strength detection and monitoring, and/or other functions that can be used by the charging station systems. In some cases, the BLEAMs are switched off when they are not in use.

One or more antennas may be configured to transmit and receive signals using one or more protocols. For instance, a main BLE module may use an antenna module to communicate with charging station with BLE signals via a BLE protocol. In various embodiments, the BLE protocol is set forth in Volume 6 of the Bluetooth Specification 4.0 (and subsequent revisions) maintained by the Bluetooth Special Interest Group. The antenna module may be located on top of the vehicle, to provide a line-of-sight to a greater area. Further, the location on top of vehicle may mitigate signal problems that might occur due to interference from metallic parts of the vehicle.

The on-board power supply system may be controlled during charging of the electric vehicle 200 so that the customer is not surprised by the on-board power supply being turned off or by excessively long charge times for the EV. The wall charger rate of power flow (which the vehicle knows) is communicated with a control module for the on-board power supply so that the on-board power supply system is aware of the incoming charge power. Additionally, one or more look up tables regarding how the charge power should be distributed may be referenced. Various examples of look up tables are described in connection with FIG. 5. In at least one embodiment, incoming charge power is distributed between the on-board power supply power pout and the HV battery power input based on the configurations specified in the applicable look up table(s).

As an example, when an electric vehicle enters a low SOC state, a driver or user of the vehicle may be alerted to the low SOC state. In some cases, the on-board power supply may be disabled or de-rated as a power saving strategy, although such strategies may be selectively performed (or not performed at all) based on user preferences. When the electric vehicle is connected to a charging station, the rate of power flow may be communicated to an activation and control system and the incoming charge power may be distributed between the on-board power supply and vehicle battery. By doing so, electrical devices connected to the on-board power supply may operate with uninterrupted power flow. In some cases, the power flow to electrical devices connected to the on-board power supply may be de-rated but otherwise uninterrupted. In some cases, the on-board power supply may be briefly shut down while the vehicle is in a low SOC state, but then restored when the vehicle is connected to the charging station or shortly thereafter once the vehicle's HV battery reaches a minimum threshold.

The vehicle may determine the intent of the vehicle user to use the on-board power supply system by identifying appliances currently plugged into the on-board power supply outlets via the Center High Mounted Stop Light (CHMSL) camera or other camera, on-board power supply usage before low SOC and then charging occurred, and/or direct user input.

In various embodiments, an activation and control system of the vehicle determines that an on-board power supply of the electric vehicle is providing power to one or more electrical devices, determines that the electric vehicle is connected to a charging device, and responsive to the determination that the electric vehicle is connected to the charging device: determines, for incoming charge power from the charging device, a rate of charge, determines an allocation of the incoming charge power from the charging device for distribution between a high voltage (HV) battery of the electric vehicle and the on-board power supply of the electric vehicle, and simultaneously provide a first portion of the incoming charge power to the HV battery and a second portion of the incoming charge power to the on-board power supply, according to the determined allocation. One or more look up tables may be used to determine how different vehicle and charger characteristics affect the overall amount of time that is needed to fully charge an electric vehicle.

For example, a look up table may use charge rate as an input to determine an appropriate distribution of power for HV battery power input and on-board power supply power output. As an example, if the charging rate is 5 kW, then a maximum of 20% of the power (1 kW) may be diverted to the on-board power supply system and the remaining 80% of the power (4 kW) may be used for charging the HV battery. The values of the look up table may be customizable based on user preferences.

In various embodiments, the activation and control module that controls the on-board power supply system functionality receives charging rate information via BLE communications with a charging device while the vehicle is charging. The on-board power supply system is aware of the incoming charge power and may reference one or more look up tables regarding how the charge power should be distributed between the on-board power supply and the HV battery. Incoming charge power from the charging device may be provided as on-board power supply power output and HV battery power input according to the user's desired preferences.

In some cases, the amount of incoming power might be insufficient to fully meet the needs of the on-board power supply system and the HV battery. This may, for example, arise in the case where industrial equipment such as an electric furnace drawing 10 kW is connected to the on-board power supply system and a L1 charging device is providing only 3-5 kW of incoming charge power. Strategies to de-rate or throttle the on-board power supply system may include shutting off individual outlets according to priority assigned in the on-board power supply setup (e.g., in the case of on-board power supply system providing power to multiple devices) and/or to perform other power management strategies such as pulse width modulation (PWN) to some or all of the outlets, thereby allowing certain types of electrical devices such as motors, lights, heaters, etc. to operate at lower capacity. In various embodiments, if on-board power supply discharge power is affected—for example, de-rated, throttled, or disabled—the vehicle may provide an indication for the user, which may be in the form of flashing list, audible noise with sound exciters, by displaying screen to communicate such change in behavior, and so forth.

In some embodiments, the vehicle does not limit the customer from using the on-board power supply system or otherwise de-rate, throttle, or disable the capacity of the discharge power while the vehicle is charging, regardless of the SOC and/or the remaining range. In various embodiments, the user is provided with a visual display of the remaining range and a calculation is made as to an updated, estimated remaining range if a mitigation strategy is taken with respect to the on-board power supply system being de-rated, throttled, or disabled. The user may be provided with such information and an option to disable the on-board power supply system to further increase the range of the vehicle, however, at the expense of diverting some or all power away from the on-board power supply system.

In some embodiments, the usage of the on-board power supply system may be used to provide users of the vehicle with recommendations for charging. For example, if the on-board power supply system is being used at a significant level, the vehicle can initiate a search for an HV charger in the nearby vicinity that is able to meet the on-board power supply system needs while also charging the HV battery at a reasonable level. For example, the total incoming charge power needed may be determined based on the SOC, the a look up table that specifies a distribution of power between the on-board power supply, a minimum range accumulation rate, and the on-board power supply system needs may be factors in determining the charging needs of the vehicle. In some cases, L1 or L2 chargers may be insufficient to fully satisfy the power needs of the on-board power supply system while also meeting the target charge rate for the HV battery. In such cases, the vehicle or a computer server in communication with the vehicle may search a network of charging stations for L3 charging station that is able to supply a sufficient amount of incoming charge power. When a suitable charging station is found with sufficient charge rate and availability (e.g., not currently or expected to be in use upon based on the vehicle's excepted transit time), the user of the vehicle may be prompted via a graphical interface (e.g., within an in-vehicle infotainment system) with a recommendation to use the identified charging station and/or navigation instructions.

Figure 3:
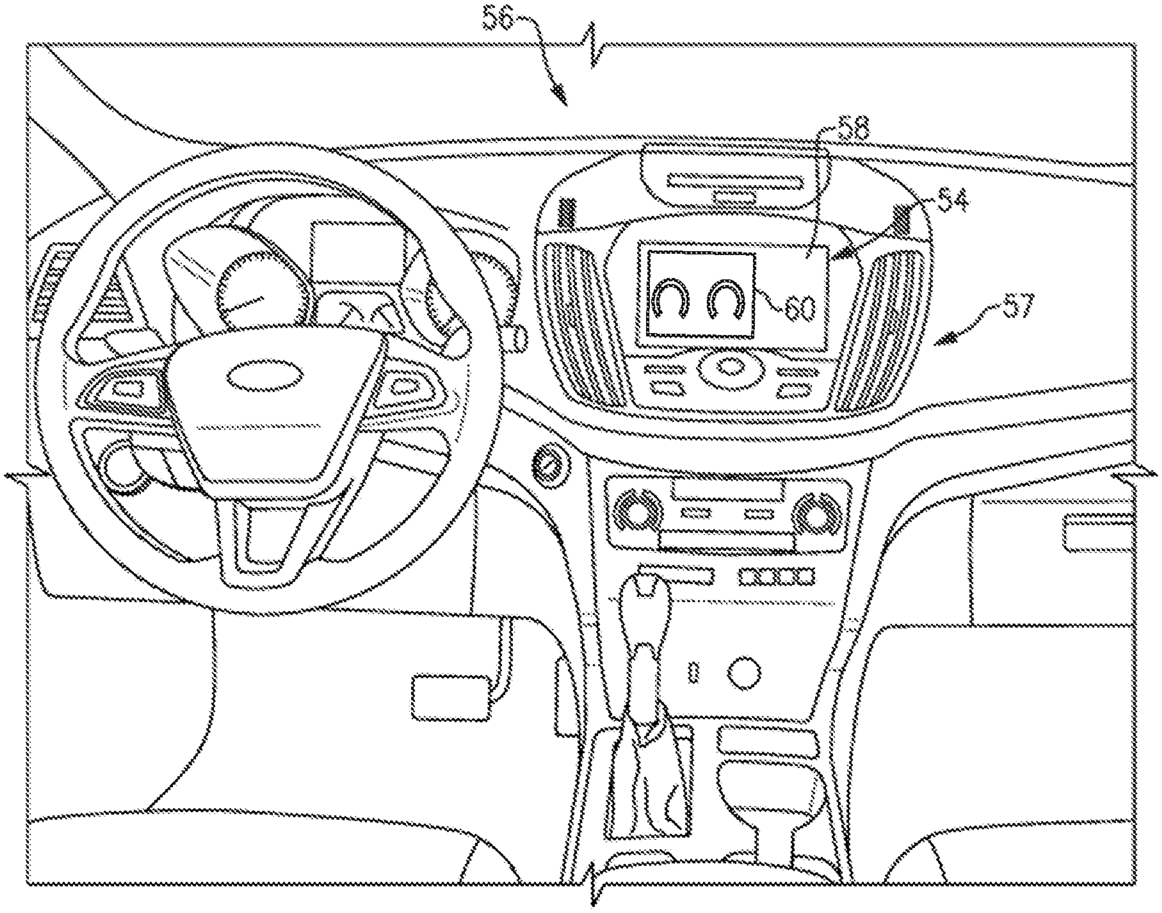
FIG. 3 illustrates an example vehicle cabin and, in particular, illustrates an in-vehicle infotainment (IVI) system that may be used to display charge distribution information, according to at least one embodiment of the present disclosure.

FIG. 3 illustrates an example vehicle cabin 56 and, in particular, illustrates an in-vehicle infotainment (IVI) system 57. The in-vehicle infotainment system 57 includes the human-machine interface 54. The human-machine interface 54 includes a touchscreen 58 configured to display information to a user and allow the user to provide inputs by touching the touchscreen 58. While a touchscreen 58 is shown and described herein, this disclosure is not limited to touchscreens, and extends to other types of displays and human-machine interfaces.

Among other functions, the controller 50 is configured to display a charge distribution information of the battery pack 24 on the human-machine interface 54. In FIG. 3, for example, a charge distribution information interface is displayed in block 60. The example displayed is illustrative of an example in which 10 kW is being distributed to the on-board power supply and 40 kW is being distributed to the battery pack 24. The charge distribution information may be displayed in other locations within the vehicle, such as a dashboard or instrument panel (IP) of the vehicle. An example view of charge distribution information that may be displayed on human-machine interface 54 is described in connection with FIG. 4.

The in-vehicle infotainment system 57 may be used to communicate the current HV battery charge rate to the user via the human-machine interface 54 or other types of interfaces, such as the vehicle's dashboard or instrument cluster (IC), or externally, for example, by communicating such information to a user's smartphone via a mobile application. Charging information such as the HV battery charge rate (e.g., in Watts or in mileage accumulation per minute) may be shown, as well as the on-board power supply power draw. The proportion of power that is being distributed to the on-board power supply power output and the HV battery power input may be shown as percentages (e.g., 20%) or numeric amounts (e.g., 10 kW). The average energy consumption may be estimated as the distance to empty and may be used to control the display of range accumulation.

Controller 50 may be referred or may implement various activation and control power systems as described herein. For example, processes described in accordance with FIG. 6 may be implemented at least in part using controller 50. The controller 50 is configured to estimate the charge distribution information of the battery pack 24 periodically and continually during operation of the electrified vehicle 12. The controller 50 may estimate the charge distribution information of the battery pack 24 using one or more algorithms that consider a number of factors, such as charge rate, charging voltage, discharge rate, discharge voltage, battery capacity, drive cycle, battery material, ambient temperature, ambient pressure, humidity, etc. In other words, the controller 50 is programmed to repeatedly perform one or more types of calculations that continually estimate the charge distribution information of the battery pack 24 while the electrified vehicle 12 is in use.

In various embodiments and use cases, the estimated charge distribution information of the battery pack 24 is treated as the actual charge distribution information of the battery pack 24. That said, the algorithms used by the controller 50 are more accurate and representative of the actual charge distribution information of the battery pack 24 in certain conditions. For example, metrics computed on a time averaged basis (e.g., 10 s, 30 s, 60 s, and 300 s) as to allow short transients in which the on-board power supply can discharge at higher magnitudes than the inputted user preferences if the on-board power supply is not operating at 100% of the allowed limit in the time before the transient. This functionality can be realized via a leaky bucket integrator algorithm.

During most operating conditions, the controller 50 estimates the state of charge of the battery pack 24, and may provide the estimated state of charge to the human-machine interface 54 where such information may be presented to a human user in a visual format through the use of a display screen such as touchscreen 58. In other words, the displayed charge distribution information (which is the charge distribution information displayed to the user via block 60 of the human-machine interface 54, for example) is the same as the estimated charge distribution information. An example interface that may be shown in block 60 is described in connection with FIG. 4.

Figure 4:
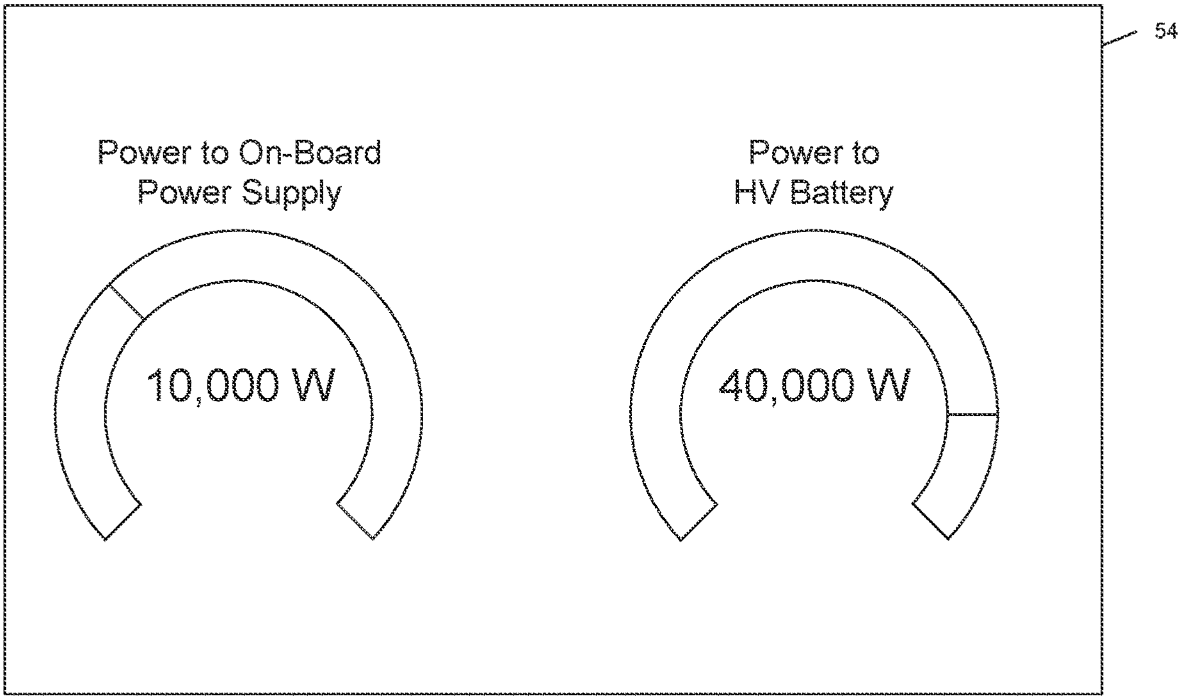
FIG. 4 depicts an illustrative example of a charge distribution information interface, according to at least one embodiment of the present disclosure.

FIG. 4 depicts an illustrative example of a charge distribution information interface, according to at least one embodiment of the present disclosure. The charge distribution information interface may be implemented as block 60 of the human-machine interface 54 described in connection with FIG. 3. In various embodiments, the charge distribution information may be displayed in other location either in place of or in addition to an infotainment system. For example, charging information may be presented in the instrument cluster (IC) of a vehicle.

Charging distribution information may be determined based on various factors, such as the determined rate of charge and the appropriate allocation of incoming charge power according to one or more look up tables. The rate of charge may be determined on a time average basis to smooth over transient charge conditions. For example, for a given state of charge (SOC), the vehicle may use a look up table to determine that the appropriate distribution of power is 20% to the on-board power supply system and 80% to the HV battery. Additionally, the incoming charge power may be determined using wired or wireless communications, such as BLE communications, with a charging station. For example, a L3 charger may provide an incoming charge of 50 kW. Based on the incoming rate of charge and the and the appropriate distribution, the separate dashboard elements may be shown to depict the amount of power that is being provided to the HV battery and the on-board power supply system respectively. In this example, 20% of a 50 kW incoming charge is being provided to the on-board power supply system as 10 kW and 80% of the 50 kW incoming charge is being provided to the HV battery as 40 kW.

In some embodiments, a touchscreen interface or other user-intractable elements may be available to allow a user to customize the distribution. For example, the user may be able to use a touch screen to tap-and-slide her finger in a clockwise manner to increase the amount of power being provided. For example, the user may increase the amount of power being provided to the on-board power supply and the look up table may be updated to accommodate the user's preferred mapping or mappings. For example, the user may decide that more power can be provided to the on-board power supply system and change the distribution to be 20 kW to the on-board power supply system (40%). This will in turn automatically update the power distribution to the HV battery down to 30 kW (60%). In some cases, there are constraints on the allowable power distributions. For example, the graphical elements may prohibit reducing the charge rate of the HV battery to fall below a minimum range accumulation rate.

Figure 5:
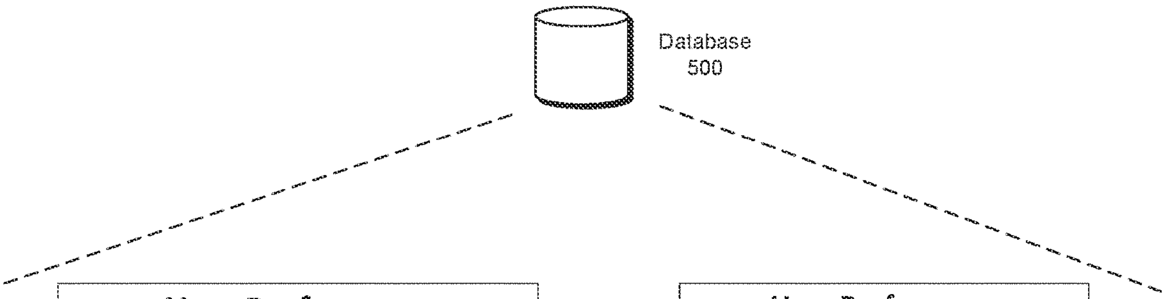
FIG. 5 illustrate an environment in which user preferences may be stored and utilized, according to at least one embodiment of the present disclosure.

FIG. 5 illustrate an environment in which user preferences may be stored and utilized, according to at least one embodiment of the present disclosure. Database 500 may refer to any suitable data storage system that may be used to persist user preference data in a digital format. Look up tables such as look up tables 502A and 502B may be stored within database 500. Database 500 may be a local device of the vehicle that is directly accessible to on-board systems, may be accessed via a network connection at a remote server, or both.

In various embodiments, database 500 stores one or more look up tables. In various embodiments, there are multiple look up tables that are simultaneously applicable to a charging regime. In other embodiments some—but not all—look up tables are applicable to a charging regime. Users may have the option to specify whether some or all look up tables should be actively utilized in the charging strategy for the user's vehicle.

As an example, look up table 502A depicts a look up table in which the charge rate is used as an input to determine an applicable distribution of power between the on-board power supply system and the HV battery. For example, if a charging device provides the vehicle a charge rate of 5 kW, then 20% (1 kW) of the incoming charge power may be supplied to the on-board power supply system and 80% (4 kW) of the incoming charge power may be supplied to the HV battery, according to look up table 502A. As a second example, if a charging device provides the vehicle a charge rate of 50 kW, then 20% (10 kW) of the incoming charge power may be supplied to the on-board power supply system and 80% (40 kW) of the incoming charge power may be supplied to the HV battery, according to look up table 502A. As a third example, if a charging device provides the vehicle a charge rate of 100 kW, then 10% (10 kW) of the incoming charge power may be supplied to the on-board power supply system and 90% (90 kW) of the incoming charge power may be supplied to the HV battery, according to look up table 502A. In various embodiments, when the charge rate is above a minimum threshold, the amount of power supplied to the HV battery is a constant value, and the remaining power may be distributed to the on-board power supply system.

As an example, look up table 502B depicts a look up table in which the state of charge (SOC) state is used as an input to determine an applicable distribution of power between the on-board power supply system and the HV battery. For example, if the SOC state is under 10%, then 90% of the incoming charge power is provided to the HV battery and 10% of the incoming charge power is provided to the on-board power supply system. As a second example, if the SOC state is between 10-20%, then 80% of the incoming charge power is provided to the HV battery and 20% of the incoming charge power is provided to the on-board power supply system. These may refer to minimums or targets for power distribution. For example, 90% power to HV battery may refer to at least 90% power and higher amounts may be acceptable, for example, when the on-board power supply system is under low load.

In some the vehicle has a minimum range accumulation rate that must be met—for example, the HV battery must realize 2 mi/min of charging while the on-board power supply is in use. In some embodiments, the vehicle has a minimum range before on-board power supply is functional again. These may be in addition to or in place of the look up tables depicted in FIG. 5.

Any of the previously referenced metrics can be controlled via a look up table where the charger capability and/or charge rate is the input and the maximum power diverted to the on-board power supply will be the output, either as a percentage or amount. These metrics can be computed on a time averaged basis (such as 10 s, 30 s, 60 s, 300 s) as to allow short transients in which the on-board power supply can discharge at higher magnitudes than the inputted user preferences if the on-board power supply is not operating at 100% of the allowed limit in the time before the transient. This functionality may be realized via a leaky bucket integrator algorithm.

Figure 6:
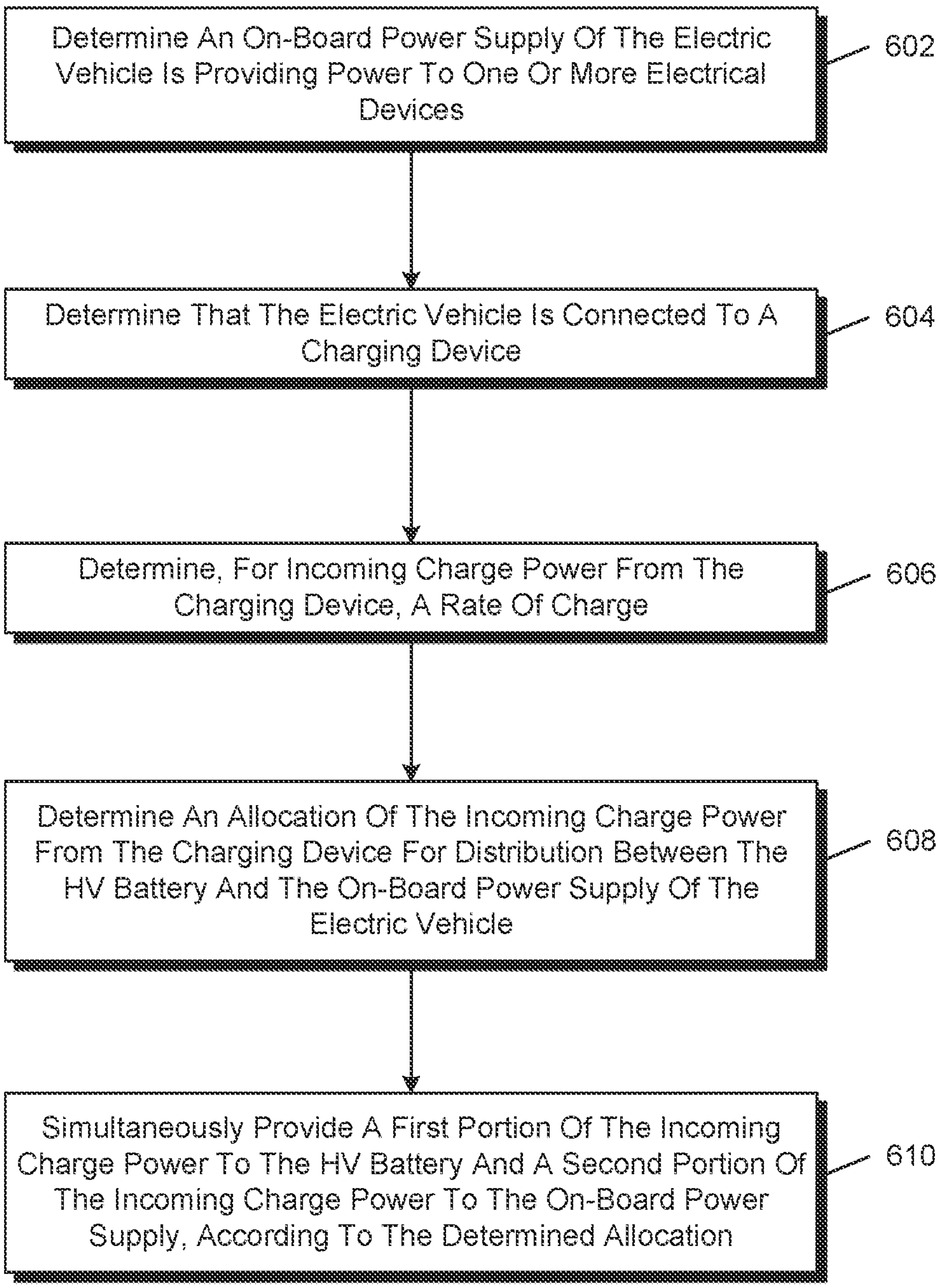
FIG. 6 shows an illustrative example of a process for managing the power flow of incoming charge power between an battery input and an on-board power supply system output, in accordance with one or more example embodiments of the present disclosure.

FIG. 6 shows an illustrative example of a process 600 for managing the power flow of incoming charge power between an battery input and an on-board power supply system output, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. In various embodiments, the computer-executable instructions are loaded on an electronic system of a vehicle that locally performs various methods, routines, and processes described in connection with process 600. In some embodiments, the computer-executable instructions are executed on a remote system (e.g., remote server) that the vehicle communications with over a network connection. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5. Process 600 may be performed by an activation and control system of an electric vehicle implemented in the context of FIG. 1, for example.

In at least one embodiment, process 600 comprises a step to determine that an on-board power supply of the electric vehicle is providing power to one or more electrical devices 602. In various embodiments, process 600 comprises a step to determine that the electric vehicle is connected to a charging device 604.

Steps 606-610 of process 60 may be performed responsive to the determination that the electric vehicle is connected to the charging device.

In various embodiments, process 600 comprises a step to determine, for incoming charge power from the charging device, a rate of charge 606. The vehicle may use wireless and/or wired communication with the charger to determine the charge rate of the HV battery.

In various embodiments, process 600 comprises a step to determine an allocation of the incoming charge power from the charging device for distribution between the HV battery and the on-board power supply of the electric vehicle 608. The allocation may be determined by obtaining a look up table that maps different rates of charges to different allocations of incoming charge power between the HV battery and the on-board power supply and determining, based at least in part on the look up table, the allocation of incoming charge power appropriate for the rate of charge from the charging device.

In various embodiments, different look up tables may be used to determine the appropriate allocation of incoming charge power. Process 600 may include steps to determine, from the look up table, a percentage of power to allocate to the HV battery, compute, from the percentage of power and the rate of charge, a second rate of charge indicative of the first portion to allocate to the HV battery, according to the look up table, determine a minimum range accumulation rate for the electric vehicle, compare the minimum range accumulation rate to the second rate of charge, and contingent upon the second rate of charge being less than the minimum range accumulation range, adjust the second rate of charge to match or exceed the minimum range accumulation rate.

In some embodiments, the allocation of incoming charge power may be determined based by determining, for the electric vehicle, a rate of discharge from the on-board power supply of the electric vehicle and to the one or more electrical devices, determine that the second portion of the incoming power allocated to the on-board power supply is insufficient to fully meet the rate of discharge for the one or more electrical devices, and reduce the rate of discharge supported by the on-board power supply. The rate of discharge may be reduced by disabling one or more outlets being used by the one or more electric devices, performing pulse width modulation (PWM), or other power management techniques.

In various embodiments, process 600 comprises a step to simultaneously provide a first portion of the incoming charge power to the HV battery and a second portion of the incoming charge power to the on-board power supply, according to the determined allocation 610.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. An electric vehicle, comprising:

one or more batteries, including at least a high voltage (HV) battery;

one or more processors; and memory storing executable instructions that, as a result of execution by the one or more processors, cause the one or more processors to:

determine that an on-board power supply of the electric vehicle is providing power to one or more electrical devices;

determine that the electric vehicle is connected to a charging device; and responsive to the determination that the electric vehicle is connected to the charging device:

determine, for incoming charge power from the charging device, a rate of charge;

obtain a look-up table that maps different rates of charging to different allocations of incoming charge power between the HV battery and the on-board power supply;

determine, based on the look-up table, an allocation of the incoming charge power from the charging device for distribution between the HV battery and the on-board power supply of the electric vehicle; and simultaneously provide a first portion of the incoming charge power to the HV battery and a second portion of the incoming charge power to the on-board power supply, according to the determined allocation.

2. The electric vehicle of claim 1, wherein the executable instructions to determine the allocation of the incoming charge power are configured to:

determine, based at least in part on the look up table, the allocation of incoming charge power appropriate for the rate of charge from the charging device.

3. The electric vehicle of claim 1, wherein the executable instructions are configured to:

determine, for the electric vehicle, a rate of discharge from the on-board power supply of the electric vehicle and to the one or more electrical devices;

determine that the second portion of the incoming charge power allocated to the on-board power supply is insufficient to fully meet the rate of discharge for the one or more electrical devices; and reduce the rate of discharge supported by the on-board power supply.

4. The electric vehicle of claim 1, wherein the executable instructions are configured to display the allocation of the incoming charge power on a human-machine interface (HMI) of the electric vehicle.

5. The electric vehicle of claim 1, wherein the rate of charge is determined on a time averaged basis.

6. The electric vehicle of claim 1, wherein the HV battery is in a low state-of-charge (SOC) state.

7. The electric vehicle of claim 1, wherein the rate of charge is determined via wireless communications with the charging device.

8. The electric vehicle of claim 2, wherein the executable instructions are configured to:

determine, from the look up table, a percentage of power to allocate to the HV battery;

compute, from the percentage of power and the rate of charge, a second rate of charge indicative of the first portion to allocate to the HV battery, according to the look up table;

determine a minimum range accumulation rate for the electric vehicle;

compare the minimum range accumulation rate to the second rate of charge; and contingent upon the second rate of charge being less than the minimum range accumulation rate, adjust the second rate of charge to match or exceed the minimum range accumulation rate.

9. The electric vehicle of claim 3, wherein the executable instructions to reduce the rate of discharge are configured to:

disable one or more outlets being used by the one or more electric devices; or perform pulse width modulation (PWM).

10. A method, comprising:

determining that an on-board power supply of an electric vehicle is providing power to one or more electrical devices;

determining that the electric vehicle is connected to a charging device; and responsive to the determining of the electric vehicle being connected to the charging device:

determining, for incoming power from the charging device and to the electric vehicle, a rate of charge;

obtaining a look-up table that maps different rates of charging to different allocations of incoming charge power between the HV battery and the on-board power supply;

determining, based on the look-up table, an allocation of the incoming power from the charging device for distribution between a high voltage (HV) battery of the electric vehicle and the on-board power supply of the electric vehicle; and simultaneously providing a first portion of the incoming power to the HV battery and a second portion of the incoming power to the on-board power supply, according to the determined allocation.

11. The method of claim 10, wherein determining the allocation of the incoming power comprises:

determining, based at least in part on the look up table, the allocation of incoming power appropriate for the rate of charging from the charging device.

12. The method of claim 10, further comprising:

determining, for the electric vehicle, a rate of discharge from the on-board power supply of the electric vehicle and to the one or more electrical devices;

determining that the second portion of the incoming power allocated to the on-board power supply is insufficient to fully meet the rate of discharge for the one or more electrical devices; and reducing the rate of discharge supported by the on-board power supply.

13. The method of claim 10, further comprising displaying the allocation of the incoming power on a human-machine interface (HMI) of the electric vehicle.

14. The method of claim 10, wherein the rate of charge is determined on a time averaged basis.

15. The method of claim 10, wherein the HV battery is in a low state-of-charge (SOC) state.

16. The method of claim 10, further comprising:

transmitting, to the charging device and using one or more Bluetooth Low Energy Antenna Modules (BLEAMs), one or more requests for the rate of charge; and receiving, from the charging device and using the one or more BLEAMs, one or more responses to the one or more requests that are indicative of the rate of charge.

17. The method of claim 11, further comprising:

determining, from the look up table, a percentage of power to allocate to the HV battery; llllllllllllllllllllllllllllllllllllll;k power and the rate of charge, a second rate of charge indicative of the first portion to allocate to the HV battery, according to the look up table;

determining a minimum range accumulation rate for the electric vehicle;

comparing the minimum range accumulation rate to the second rate of charge; and contingent upon the second rate of charge being less than the minimum range accumulation rate, adjusting the second rate of charge to match or exceed the minimum range accumulation rate.

18. The method of claim 12, wherein reducing the rate of discharge comprises at least one of:

disabling one or more outlets being used by the one or more electric devices; or performing pulse width modulation (PWM).

19. An activation and control system for an electric vehicle, comprising executable instructions that, as a result of execution by one or more processors, cause one or more processors to:

determine that an on-board power supply of the electric vehicle is providing power to one or more electrical devices;

determine that the electric vehicle is connected to a charging device; and responsive to the determination that the electric vehicle is connected to the charging device:

determine, for an incoming charge power from the charging device, a rate of charge;

obtain a look-up table that maps different rates of charges to different allocations of incoming charge power between the HV battery and the on-board power supply;

determine, based on the look-up table, an allocation of the incoming charge power from the charging device for distribution between a high voltage (HV) battery of the electric vehicle and the on-board power supply of the electric vehicle; and simultaneously provide a first portion of the incoming charge power to the HV battery and a second portion of the incoming charge power to the on-board power supply, according to the determined allocation.

20. The activation and control system of claim 19, wherein the executable instructions to determine the allocation of the incoming charge power are configured to:

determine, based at least in part on the look up table, the allocation of incoming charge power appropriate for the rate of charge from the charging device.

* * * * *